US012715817B2

(12) United States Patent
Sugiyama et al.

(10) Patent No.: US 12,715,817 B2
(45) Date of Patent: Aug. 25, 2026

(54) HIGH-ZIRCONIA ELECTRO-FUSED CAST REFRACTORY MATERIAL

(71) Applicant: Saint-Gobain TM K.K., Tokyo (JP)

(72) Inventors: Hiroshi Sugiyama, Tokyo (JP); Yasuo Misu, Tokyo (JP); Itaru Hashimoto, Tokyo (JP)

(73) Assignee: Saint-Gobain TM K.K., Tokyo (JP)

( * ) Notice: Subject to any disclaimer, the term of this patent is extended or adjusted under 35 U.S.C. 154(b) by 568 days.

(21) Appl. No.: 18/037,974

(22) PCT Filed: Nov. 24, 2021

(86) PCT No.: PCT/JP2021/043043
§ 371 (c)(1),
(2) Date: May 19, 2023

(87) PCT Pub. No.: WO2022/114022
PCT Pub. Date: Jun. 2, 2022

(65) Prior Publication Data
US 2023/0406775 A1 Dec. 21, 2023

(30) Foreign Application Priority Data
Nov. 24, 2020 (JP) ................................ 2020-194321

(51) Int. Cl.
*C04B 35/49* (2006.01)
*F27D 1/00* (2006.01)

(52) U.S. Cl.
CPC ............ *C04B 35/49* (2013.01); *F27D 1/0006* (2013.01); *C04B 2235/3217* (2013.01);
(Continued)

(58) Field of Classification Search
CPC ............ C04B 35/49; C04B 2235/3217; C04B 2235/3244; C04B 2235/3418
See application file for complete search history.

(56) References Cited

U.S. PATENT DOCUMENTS 6,158,248 A 12/2000 Beppu
2015/0024923 A1 1/2015 Tomura et al.
(Continued)

FOREIGN PATENT DOCUMENTS

CN 109467447 A 3/2019
CN 111278789 A 6/2020
(Continued)

OTHER PUBLICATIONS

JPH092870A machine translation (Year: 1997).*
(Continued)

*Primary Examiner* — Cameron K Miller
(74) *Attorney, Agent, or Firm* — Osha Bergman Watanabe & Burton LLP

(57) ABSTRACT

A high zirconia electrically-fused cast refractory has a chemical composition including more than 95% by mass and 98% by mass or less of $ZrO_2$, 0.1 to 1.5% by mass of $Al_2O_3$, 1 to 2.5% by mass of $SiO_2$, 0 to 0.1% by mass of $K_2O$, 0.01 to 0.3% by mass of $Na_2O$ and $K_2O$ in total, 0.02 to 0.4% by mass of $B_2O_3$, 0.01 to 0.6% by mass of BaO, 0.01 to 0.4% by mass of $SnO_2$, 0.3% by mass or less of $Fe_2O_3$ and $TiO_2$ in total, and 0.04% by mass or less of $P_2O_5$, wherein the contents of $B_2O_3$ and $SnO_2$ satisfy the following Formulas (1) and (2):

$$0.20 \leq (SnO_2/B_2O_3) < 6.5 \quad (1)$$

$$0.14\% \text{ by mass} \leq (C_{SnO2} + C_{B2O3}/2) \leq 0.55\% \text{ by mass.} \quad (2)$$

In Formula (2), $C_{SnO2}$ represents the content of $SnO_2$, and $C_{B2O3}$ represents the content of $B_2O_3$, expressed in % by mass in the refractory.

8 Claims, 1 Drawing Sheet

(52) U.S. Cl.
CPC ................. *C04B 2235/3244* (2013.01); *C04B 2235/3418* (2013.01); *C04B 2235/725* (2013.01); *C04B 2235/727* (2013.01); *C04B 2235/77* (2013.01); *C04B 2235/9669* (2013.01)

(56) References Cited

U.S. PATENT DOCUMENTS

| | | | |
|---|---|---|---|
| 2016/0362342 | A1 | 12/2016 | Sugiyama et al. |
| 2017/0088470 | A1 | 3/2017 | Sugiyama et al. |

FOREIGN PATENT DOCUMENTS

| | | | | |
|---|---|---|---|---|
| EP | 3708556 | A1 | | 9/2020 |
| IN | 201717014971 | B | | 9/2017 |
| IN | 201717015192 | A | | 11/2019 |
| JP | S55-3319 | B2 | | 1/1980 |
| JP | S59-12619 | B2 | | 3/1984 |
| JP | H03-28175 | A | | 2/1991 |
| JP | H08-48573 | A | | 2/1996 |
| JP | H092870 | A | * | 1/1997 |
| JP | H11-157947 | A | | 6/1999 |
| JP | H11343174 | A | | 12/1999 |
| JP | 2001-206767 | A | | 7/2001 |
| JP | 2009-527454 | A | | 7/2009 |
| JP | 2014-129199 | A | | 7/2014 |
| JP | 2014-210696 | A | | 11/2014 |
| JP | 2015-40144 | A | | 3/2015 |
| JP | 5806424 | B1 | | 11/2015 |
| JP | 2016-74563 | A | | 5/2016 |
| JP | 2016-141593 | A | | 8/2016 |
| JP | 2019-48761 | A | | 3/2019 |
| TW | 201912610 | A | | 4/2019 |
| WO | 2013/151106 | A1 | | 10/2013 |
| WO | 2013/151107 | A1 | | 10/2013 |
| WO | 2013/155281 | A1 | | 10/2013 |
| WO | 2016056146 | A1 | | 4/2016 |
| WO | 2016125317 | A1 | | 8/2016 |
| WO | 2016/172274 | A1 | | 10/2016 |

OTHER PUBLICATIONS

Office Action issued in Chinese Application No. 202180078583.8 mailed on Jan. 27, 2024 (15 pages).

Lisachuk, G. V., et.al., Chemistry and Chemical Technology, "Theoretical background of alkaline-free tin content coatings on ceramics in the system RO—SnO2—Al2O3—SiO2", 2013 (4 pages).

International Search Report issued in corresponding International Application No. PCT/JP2021/043043 mailed Jan. 18, 2022 (5 pages).

Written Opinion issued in corresponding International Application No. PCT/JP2021/043043 mailed Jan. 18, 2022 (4 pages).

* cited by examiner 4
5
6

HIGH-ZIRCONIA ELECTRO-FUSED CAST REFRACTORY MATERIAL

TECHNICAL FIELD

The present invention relates to a high zirconia electrically-fused cast refractory having excellent corrosion resistance, which is particularly suitable for use in a glass melting furnace.

BACKGROUND ART

Conventionally, as a refractory for a glass melting furnace, an electrically-fused cast refractory (may also be referred to as "refractory" for short) has been widely used.

Electrically-fused cast refractory is a refractory which is dense and has excellent corrosion resistance to molten glass, and is produced by melting a raw material obtained by mixing predetermined amounts of main components, such as alumina, silica, and zirconia, with minor components, such as boric acid and soda, in an electric arc furnace; casting the molten material into a refractory mold; cooling it in an annealing member; and solidifying it into a mold shape.

Since the electrically-fused cast refractory is produced through a process of casting a melt into a mold, the production method is different from that of a sintered refractory which is produced by sintering and bonding crystal particles. In addition, technical means and developmental methods as well as solutions and methods used for the sintered refractory cannot be used for the electrically-fused cast refractory, and vice versa. Hereafter, what is described herein as refractory refers to the electrically-fused cast refractory.

As such an electrically-fused cast refractory, a high zirconia electrically-fused cast refractory containing 85% by mass or more of $ZrO_2$ is used.

The high zirconia electrically-fused cast refractory has high corrosion resistance to any types of molten glass, since it has low solubility in glass, has $ZrO_2$ as a main component which has high melting point, has higher $ZrO_2$ content, and has a dense structure.

Further, the high zirconia electrically-fused cast refractory has an excellent feature of hardly causing defects such as stones and cords in the molten glass, since it has a property of not forming a reaction layer at the interface with the molten glass.

Therefore, the high zirconia electrically-fused refractory is a particularly suitable refractory for producing high quality glass.

The mineral constitution of the high zirconia electrically-fused cast refractory is mostly represented by monoclinic $ZrO_2$ crystals, and a small amount of glass phase fill the grain boundaries of these $ZrO_2$ crystals.

This small amount of glass phase differs greatly from the composition of glass used in the glass industry in that it is very $SiO_2$ rich. Further, since it is melted together with the high content of $ZrO_2$ and is produced via a step of casting into a mold, the technical means and developmental methods as well as solutions and methods used for the glass industry cannot be used for the electrically-fused cast refractory, and vice versa.

However, the nature of the high zirconia electrically-fused cast refractory is greatly influenced by the type and amount of the components constituting this small amount of glass phase.

Generally, the glass phase of the high zirconia electrically-fused cast refractory is composed of oxides such as $Al_2O_3$, $SiO_2$, $Na_2O$, $B_2O_3$, and $P_2O_5$.

On the other hand, $ZrO_2$ crystals undergo reversible transformation of crystal phases between monoclinic and tetragonal, accompanied by an abrupt volume change in the vicinity of 1000° C. (during temperature decrease) to 1150° C. (during temperature rise).

The stress caused by this volume change associated with the transformation of $ZrO_2$ crystals is mitigated by the flow of the glass phase filling the grain boundaries of $ZrO_2$ crystals, and this makes it possible to industrially produce a high zirconia electrically-fused cast refractory having a $ZrO_2$ content of 93 to 94% by mass, without causing cracks at the time of production and at elevated temperature.

When the high zirconia electrically-fused cast refractory is heated alone or subjected to a thermal cycle alone, silica ($SiO_2$) and zirconia ($ZrO_2$) crystals, which are the main components of the glass phase of the refractory, may react to form zircon ($ZrO_2 \cdot SiO_2$) crystals.

In this case, since the zircon crystal is formed at the interface between $ZrO_2$ crystals and the glass phase filling the grain boundaries of $ZrO_2$ crystals, or in the glass phase, the formation of the zircon crystals leads to a relative reduction of the glass phase. Further, as the reduction of the glass phase progresses through the growth or increase of the zircon crystal, it becomes difficult to absorb the abrupt volume change of $ZrO_2$ crystal in the vicinity of 1000° C. to 1150° C., and as a result, strength is reduced, and cracks are relatively easily formed.

Further, when the refractory is used as a glass melting furnace, the contact with the molten glass may facilitate formation of zircon crystals in the refractory.

In particular, when the high zirconia electrically-fused cast refractory is used as a melting furnace for alkali-free glass such as liquid crystal panel glass (LCD), zircon crystals tend to be easily formed.

The formation of the zircon crystal in the glass melting furnace is caused by a substitution of the constituents of the molten glass and the constituents of the glass phase of the high zirconia electrically-fused cast refractory when the glass is melted, which is caused by a concentration difference between these constituents.

In other words, a component that suppresses the formation of zircon crystals in the high zirconia electrically-fused cast refractory diffuses into the molten glass. Alternatively, a component that facilitates formation of zircon crystals enters into the high zirconia electrically-fused cast refractory from the molten glass. It is considered that the one or both thereof promotes the formation of zircon crystals in a high zirconia electrically-fused cast refractory.

When zircon crystals are formed in a high zirconia electrically-fused cast refractory used for a glass melting furnace and the amount of the glass phase is reduced, it is difficult to absorb the abrupt volume change in $ZrO_2$ crystals occurring in the vicinity of 1000° C. to 1150° C., as described above.

As a result, when subjected to a thermal cycle due to the heating or the operating temperature change during the glass melting furnace operation, the residual volume expansion of the high zirconia electrically-fused cast refractory itself becomes extremely large, the strength of the structure is decreased, and cracks easily occur in the high zirconia electrically-fuse cast refractory. At this time, the cracked portion is selectively eroded, and further, when the erosion proceeds, the crystals constituting the high zirconia electrically-fused cast refractory is contaminated into the molten glass, and as a result, it may lead to a decrease in the quality of the glass.

Further, due to the thermal cycle caused by a change in the operating temperature during the operation of a glass melting furnace, not only the crystals constituting the refractory is contaminated into the glass, but also the erosion from the glass is accelerated due to the decrease in the strength of the refractory structure.

Thus, in the operation of the glass melting furnace, in order to perform stable operation over a long period of time and to maintain stable glass quality, it is very important to suppress the zircon crystals formed in the high zirconia electrically-fused cast refractory.

Further, in recent years, in order to improve the characteristics of glass products, refractories used as a material for a melting furnace are operated under stricter temperature conditions than conventional refractories, such as the production of glass products having higher melting point than conventional refractories and/or the operation under the increased temperature of melting furnaces for improved productivity. Under such conditions, even the conventional high zirconia electrically-fused cast refractories having $ZrO_2$ content of 93 to 94% by mass may not have enough corrosion resistance. Therefore, there is a desire for a high zirconia electrically-fused cast refractory having a higher $ZrO_2$ content than conventional products.

Conventionally, researches have been conducted for the high zirconia electrically-fused cast refractories having relatively higher $ZrO_2$ content and less likely to form zircon crystals.

In Patent Document 1, a high zirconia cast refractory is proposed in which $ZrO_2$ is more than 90% and 98% or less, CuO or $B_2O_3$ or both is 0.1 to 1.0% in total, the ratio of $Al_2O_3$ and $SiO_2$ ($Al_2O_3/SiO_2$) is 0.5 or less, and $Fe_2O_3$ and $TiO_2$ are not contained in an amount of 0.3% or more, respectively.

In the refractory according to Document 1, when the refractory is in contact with the molten glass, $Na_2O$, which is an impurity that suppresses the formation of the zircon crystal, tends to migrate from the refractory to the molten glass, and there is a possibility that the suppression of the formation of the zircon crystal is insufficient. Document 1 does not describe the inclusion of $SnO_2$ and BaO in the refractory.

Patent document 2 describes a high zirconia hot melt refractory that contains 85 to 97% $ZrO_2$, 0.1 to 3% $P_2O_5$, 2 to 10% $SiO_2$, and up to 3% $Al_2O_3$ and is substantially free of rare earth oxides.

This refractory contains a relatively large amount of $P_2O_5$ that significantly accelerates the formation of zircon crystals at the time of heating, which causes cracking in the refractory due to an increase in the residual volume expansion after heating, which results from the formation of zircon crystals, and as a result, corrosion resistance may become insufficient.

In Patent Document 3, a refractory is proposed which contains more than 92% by weight of $ZrO_2$, 2 to 6.5% by weight of $SiO_2$, 0.12 to 1.0% by weight of $Na_2O$, 0.4 to 1.15% by weight of $Al_2O_3$, less than 0.55% by weight of $Fe_2O_3$+$TiO_2$, and less than 0.05% by weight of $P_2O_5$.

Since the refractory according to Document 3 does not contain $B_2O_3$, cracking relatively easily occurs in the refractory during production. In addition, $Na_2O$ and $K_2O$ easily migrate to the molten glass under the condition in contact with molten glass, and which causes cracking in the refractory due to an increase in the residual volume expansion after the heating, which results from the formation of zircon crystals, and as a result, corrosion resistance becomes insufficient. Document 3 does not describe the inclusion of $SnO_2$ and BaO in the refractory.

In Patent Document 4, a high zirconia fused refractory is proposed which is characterized in that it contains 85 to 96% by weight of $ZrO_2$, 3 to 8% by weight of $SiO_2$, 0.1 to 2% by weight of $Al_2O_3$, the content of $B_2O_3$ is 0.05 to 3% by weight, the content of $Na_2O$ is 0.05% by weight or more, the content of $Na_2O$ and $K_2O$ is 0.05 to 0.6% by weight, the content of BaO and SrO and MgO is 0.05 to 3% by weight in total, and the content of $Fe_2O_3$ and $TiO_2$ in total is 0.3% by weight or less, and not substantially containing $P_2O_5$ and CuO.

In the refractory of Document 4, $Na_2O$ and $K_2O$ tend to migrate to the molten glass under the condition in contact with molten glass, which facilitates the formation of zircon crystals, resulting in insufficient corrosion resistance. The refractory of Document 4 contains 3% by mass or more of $SiO_2$.

In Patent Document 5, there is proposed a high zirconia electrically-fused cast refractory in which $ZrO_2$ is 89 to 96 wt %, $SiO_2$ is 2.5 to 8.5 wt %, $Al_2O_3$ is 0.2 to 1.5 wt %, $P_2O_5$ is less than 0.5 wt %, $B_2O_3$ is less than 1.2 wt %, CuO is less than 0.3 wt %, $P_2O_5$+$B_2O_3$ is more than 0.01 and less than 1.7 wt %, $Na_2O$+$K_2O$ is 0.05 to 1.0 wt %, BaO is 0.01 to 0.5 wt %, $SnO_2$ is less than 0.5 wt %, and $Fe_2O_3$+$TiO_2$ is 0.3 wt % or less.

In the refractory of Document 5, under the condition in which the refractory is contacted with the molten glass, $Na_2O$ that suppresses the formation of zircon crystals tends to migrate from the refractory to the molten glass, which may result in insufficient corrosion resistance.

Patent document 6 discloses an electrically-fused refractory having high zirconia content, which contains, in wt % based on the oxide, and based on more than 98.5% of the total, more than 85% of $ZrO_2$+$HfO_2$, 1 to 10% of $SiO_2$, 0.1 to 2.4% of $Al_2O_3$, less than 1.5% of $B_2O_3$.

Document 6 does not describe the inclusion of BaO and $SnO_2$ in the refractory.

In Patent document 7, a refractory is proposed in which $ZrO_2$ is 96.5 to 98.5 mass %, $SiO_2$ is 0.8 to 2.7 mass %, $Na_2O$ and $K_2O$ are 0.04 to 0.35 mass %, $B_2O_3$ is 0.02 to 0.18 mass %, the contents of $Na_2O$, $K_2O$ and $B_2O_3$ satisfy a specific relationship, and having a porosity of 1.5% or less and good corrosion resistance.

Document 7 mentions the porosity, but there is no description or example as to the specific measures for reducing the porosity of the refractory. In order to reduce the porosity of the high zirconia electrically-fused cast refractory to 1.5% or less, the content of $SiO_2$ may be set to 3.5% by mass or more to improve the melt fluidity of the refractory, or $SnO_2$ may be added for degassing the molten metal of the refractory according to the present invention. If the reduction of the porosity is insufficient, it is not suitable for industrial mass production. Document 7 does not describe the inclusion of BaO and $SnO_2$ in the refractory. In the refractory of Document 7, $Na_2O$ and $K_2O$ tend to migrate to the molten glass when the refractory is heated alone or heated in contact with the molten glass, and the formation of zircon crystals may cause the increase in the residual volume expansion after the heat treatment, resulting in insufficient corrosion resistance.

Patent Document 8 proposes a high zirconia electrically-fused cast refractory in which $ZrO_2$ is 85 to 95% by weight, $Al_2O_3$ is 0.4 to 2.5% by weight, $SiO_2$ is 3.5 to 10% by weight, $Na_2O$ and $K_2O$ are 0.05 to 1% by weight in total, $B_2O_3$ is more than 0.04% by weight and 1% by weight or less, $P_2O_5$ is 0.02% by weight or less, MgO is 0.05% by weight or less, CaO is 0.01 to 0.2% by weight, with regard to SrO and BaO, when only one of these is contained, SrO is 0.3 to 3% by weight or BaO is more than 0.5% by weight and 3% by weight or less, and when both of these are contained, SrO is 0.3% by weight or more and the total of SrO and BaO is 0.3 to 3% by weight, $SnO_2$ is 0.01 to 0.7% by weight, and the total of $Fe_2O_3$ and $TiO_2$ is 0.3% by weight or less.

The refractory of Document 8 contains 95% by mass or less of $ZrO_2$ which determines the corrosion resistance of a high zirconia electrically-fused cast refractory, and the corrosion resistance thereof is insufficient under operating conditions that are more severe than in the past, such as the production of recent glass products having high melting points and/or the operation under the condition in which the operating temperature of a melting furnace is increased to improve productivity. Further, the refractory of Document 8 contains 3.5% by mass or more of $SiO_2$.

In Patent Document 9, a high zirconia electrically-fused refractory is proposed in which $ZrO_2$ is 96.7 to 98.5 mass %, $SiO_2$ is 0.8 to 2.7 mass %, $Na_2O$ is 0 to 0.2 mass %, $K_2O$ is 0.21 to 1 mass %, $Al_2O_3$ is 0.1 to 0.4 mass %, $B_2O_3$ is not contained substantially, and the content of $Na_2O$ and $K_2O$ satisfies a specific relationship.

Since the refractory of Document 9 is substantially free of $B_2O_3$, cracking tends to occur in the refractory during production. In addition, in this refractory, $Na_2O$ and $K_2O$ tend to migrate to the molten glass when the refractory is heated alone or the refractory is in contact with the molten glass, and the formation of zircon crystals may cause the increase in the residual volume expansion after being heated, which results in insufficient corrosion resistance.

CITATION LIST

Patent Literature

[Patent Document 1] JP-S55-3319B
[Patent Document 2] JP-S59-12619B
[Patent Document 3] JP-H3-28175A
[Patent Document 4] JP-H8-48573A
[Patent Document 5] JP-H9-2870A
[Patent Document 6] JP2009-527454A
[Patent Document 7] JP2014-129199A
[Patent Document 8] JP2015-40144A
[Patent Document 9] JP2019-48761A

SUMMARY OF INVENTION

Technical Problem

In a refractory having more than 95% of $ZrO_2$ content, when raw materials for the refractory is melted, the viscosity of the melt is high because $SiO_2$ content is relatively small, the melting temperature becomes high and exceeds 2500° C., and in particular, the viscosity of the melt of the refractory is easily changed rapidly.

In other words, since the viscosity of the original melt is high and the temperature difference up to solidification is relatively large, the viscosity tends to become higher as it cools, compared to the conventional high zirconia electrically-fused cast refractory. That is, when casted in the mold, the viscosity of the melt tends to increase due to the decrease in the melt temperature, and gas tends to be trapped in the refractory due to rapid deterioration of the fluidity of the melt. Further, when $ZrO_2$ content exceeds 95% by mass, $SiO_2$ content is relatively reduced, which makes it difficult to absorb the abrupt volume change of $ZrO_2$ crystals in the vicinity of 1000° C. to 1150° C., and as a result, cracking tends to occur during production.

Therefore, conventionally, it was believed that a high zirconia electrically-fused cast refractory having more than 95% of $ZrO_2$ and less than 3.5% of $SiO_2$ is difficult to mass-produce industrially, since they develop cracks during production and it is difficult to obtain dense products, which differ significantly from the conventional high zirconia electrically-fused cast refractories.

Further, when a product having a high porosity and not being dense is used in a melting furnace for producing a glass product, erosion from the glass is accelerated, and the service life of the glass melting furnace is shortened. Therefore, low porosity, which is an indicator of density of the refractory, is the very important factor for the corrosion resistance of the refractory.

Furthermore, under the condition in which the refractory is heated alone or in contact with molten glass, if a refractory has a $ZrO_2$ content of more than 95%, relatively low content of $SiO_2$ may be used for the production of zircon crystals. In this case, the glass phase of the refractory, which is mainly composed of $SiO_2$, is more likely to be reduced, as compared to the typical high zirconia electrically-fused cast refractory. Therefore, when zircon crystals are produced even in a small amount, it becomes difficult to absorb the abrupt volume change of $ZrO_2$ crystals in the vicinity of 1000° C. to 1150° C., and the strength of the structure is decreased, and as a result, cracking is more likely to occur, as compared to the typical high zirconia electrically-fused cast refractory.

Therefore, there has been demand for a high zirconia electrically-fused cast refractory having high corrosion resistance and containing more than 95% by mass of $ZrO_2$, which is less likely to be cracked at the time of production; has lower porosity; is dense; has large bulk density; and is less likely to form zircon crystals under conditions in which the refractory is heated alone or heated in contact with molten glass.

An object of the present invention is to provide a high zirconia electrically-fused cast refractory containing more than 95% by mass of $ZrO_2$, which is less likely to be cracked at the time of production, has lower porosity and larger bulk density and thereby having excellent corrosion resistance, can suppress the formation of zircon crystals when heated alone or heated in contact with molten glass, and is easy to mass-produce industrially.

Solution to Problem

Examples of the solutions according to the present invention are the following high zirconia electrically-fused cast refractories:

Embodiment 1

A high zirconia electrically-fused cast refractory, comprising, as a chemical composition, more than 95% by mass and 98% by mass or less of $ZrO_2$,
0.1 to 1.5% by mass of $Al_2O_3$,
1 to 2.5% by mass of $SiO_2$,
0 to 0.1% by mass of $K_2O$,
0.01 to 0.3% by mass of $Na_2O$ and $K_2O$ in total,
0.02 to 0.4% by mass of $B_2O_3$,
0.01 to 0.6% by mass of BaO,
0.01 to 0.4% by mass of $SnO_2$,
0.3% by mass or less of $Fe_2O_3$ and $TiO_2$ in total, and
0.04% by mass or less of $P_2O_5$, wherein the contents of $B_2O_3$ and $SnO_2$ satisfy the following Formulas (1) and (2):

$$0.20 \le (SnO_2/B_2O_3) < 6.5 \quad (1)$$

$$0.14\% \text{ by mass} \le (C_{SnO2} + C_{B2O3}/2) \le 0.55\% \text{ by mass.} \quad (2)$$

(in Formula (2), $C_{SnO2}$ represents the content of $SnO_2$, and $C_{B2O3}$ represents the content of $B_2O_3$, expressed in % by mass in the refractory).

Embodiment 2

A high zirconia electrically-fused cast refractory, comprising, as a chemical composition, 96 to 98% by mass of $ZrO_2$,
0.4 to 1% by mass of $Al_2O_3$,
1% by mass or more and less than 2.5% by mass of $SiO_2$,
0 to 0.08% by mass of $K_2O$,
0.05 to 0.3% by mass of $Na_2O$ and $K_2O$ in total,
0.05 to 0.35% by mass of $B_2O_3$,
0.1 to 0.5% by mass of BaO,
0.05 to 0.35% by mass of $SnO_2$,
0.3% by mass or less of $Fe_2O_3$ and $TiO_2$ in total, and
0.04% by mass or less of $P_2O_5$, wherein the contents of $B_2O_3$ and $SnO_2$ satisfy the following Formulas (3) and (4):

$$0.40 \le (SnO_2/B_2O_3) < 4.5 \quad (3)$$

$$0.16\% \text{ by mass} \le (C_{SnO2} + C_{B2O3}) \le 0.45\% \text{ by mass} \quad (4)$$

(in Formula (4), $C_{SnO2}$ represents the content of $SnO_2$, and $C_{B2O3}$ represents the content of $B_2O_3$, expressed in % by mass in the refractory).

Embodiment 3

A high zirconia electrically-fused cast refractory, comprising, as a chemical composition, 96.5 to 98% by mass of $ZrO_2$,
0.65 to 0.95% by mass of $Al_2O_3$,
1.5% by mass or more and less than 2.5% by mass of $SiO_2$,
0 to 0.05% by mass of $K_2O$,
0.05 to 0.25% by mass of $Na_2O$ and $K_2O$ in total,
0.05 to 0.3% by mass of $B_2O_3$,
0.15 to 0.5% by mass of BaO,
0.1 to 0.35% by mass of $SnO_2$,
0.2% by mass or less of $Fe_2O_3$ and $TiO_2$ in total, and
0.04% by mass or less of $P_2O_5$, wherein the contents of $B_2O_3$ and $SnO_2$ satisfy the following Formulas (5) and (6):

$$0.60 \le (SnO_2/B_2O_3) < 4.0 \quad (5)$$

$$0.18\% \text{ by mass} \le (C_{SnO2} + C_{B2O3}/2) \le 0.40\% \text{ by mass} \quad (6)$$

(in Formula (6), $C_{SnO2}$ represents the content of $SnO_2$, and $C_{B2O3}$ represents the content of $B_2O_3$, expressed in % by mass in the refractory).

Embodiment 4

The high zirconia electrically-fused cast refractory according to one of Embodiments 1 to 3, characterized in that the content of CuO is less than 0.01% by mass.

Embodiment 5

The high zirconia electrically-fused cast refractory according to one of Embodiments 1 to 4, characterized in that the content of MgO is 0.05% by mass or less.

Embodiment 6

The high zirconia electrically-fused cast refractory according to one of Embodiments 1 to 5, characterized in that the content of CaO is 0.01 to 0.2% by mass.

Embodiment 7

The high zirconia electrically-fused cast refractory according to one of Embodiments 1 to 6, characterized in that the porosity is 1.5% or less.

Embodiment 8

The high zirconia electrically-fused cast refractory according to one of Embodiments 1 to 7, characterized in that the bulk density is 5.40 g/cm$^3$ or more.

Embodiment 9

The high zirconia electrically-fused cast refractory according to one of Embodiments 1 to 8, which is used for a glass melting furnace.

Advantageous Effects of Invention

According to the high zirconia electrically-fused cast refractory of the present invention, there is provided a high zirconia electrically-fused cast refractory which exhibits less cracks during production, has low porosity and large bulk density and thereby having excellent corrosion resistance, can suppress the formation of zircon crystals when heated alone or heated under the condition in contact with molten glass, and is easy to mass-produce industrially.

Therefore, by using the high zirconia electrically-fused cast refractory of the present invention in a glass melting furnace, since this refractory is excellent in corrosion resistance and less forms zircon crystals, it hardly exhibits crack formation and crack development during operation and enables long-term operation, which is very advantageous in industrial use.

DESCRIPTION OF EMBODIMENTS

Figures 1, 2:
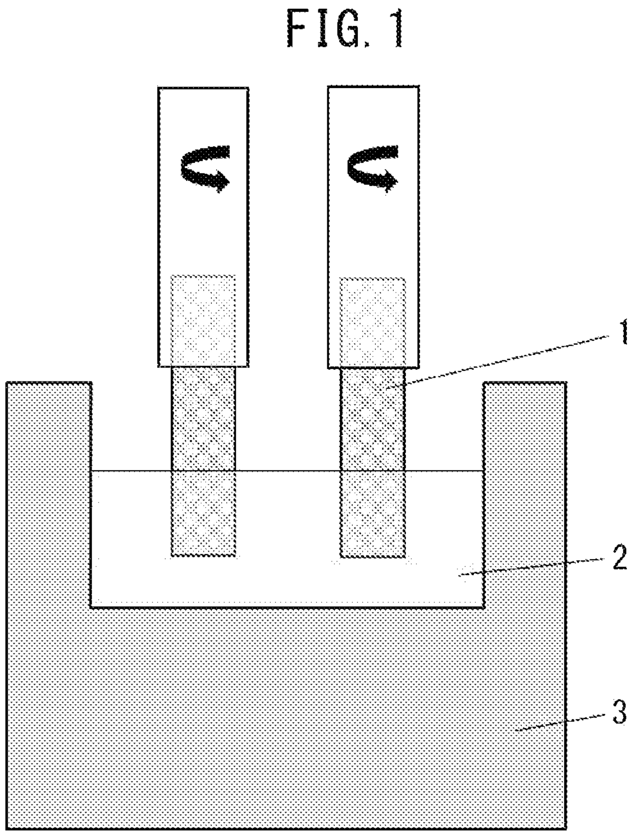
FIG. 1 is a diagram of an apparatus used for evaluation of corrosion resistance.
FIG. 2 is a photograph of the appearance of the samples after the corrosion resistance evaluation.

As a result of intensive study, the present inventors have found that, in a refractory having more than 95% by mass and 98% by mass or less of $ZrO_2$, by limiting the range of the content for each component $Al_2O_3$, $SiO_2$, $K_2O$, $Na_2O$, $B_2O_3$, $P_2O_5$, BaO, $Fe_2O_3$, $TiO_2$ and $SnO_2$, and further by specifying the ratio and the relationship of two components having conflicting properties, i.e., $B_2O_3$, which promotes the formation of zircon crystals, and $SnO_2$, which inhibits the formation of zircon crystals, it is possible to provide a high zirconia electrically-fused cast refractory which exhibits less cracks during production, has low porosity and large bulk density and thereby having excellent corrosion resistance, can suppress the formation of zircon crystals when heated alone or heated under the condition in contact with molten glass, and is easy to mass-produce industrially.

$SnO_2$, which is a critical component of the present invention, releases $O_2$ by a reduction reaction at the time of temperature increase. When a composition having more than 95% by mass of $ZrO_2$ content is melted, the viscosity of the melt tends to change rapidly, and the viscosity tends to increase as it cools, since the original viscosity is high and the temperature difference leading to the solidification is larger than conventional refractories. In other words, the viscosity of the melt tends to increase due to the decrease in the melt temperature at the time of casting in the mold, and the gas tends to be trapped in the refractory due to rapid deterioration of fluidity of the melt. However, it has been found that the reduction reaction of $SnO_2$ has an effect of generating $O_2$ gas in the melt during casting in the mold, and the $O_2$ gas incorporates the fine gas trapped in the melt prior to solidification as well as the air entrained by casting, and thereby releasing them simultaneously to the outside.

In particular, fine gas trapped in the melt prior to solidification has low ascending rate and therefore tends to be retained in the melt of the refractory having more than 95% $ZrO_2$ which exhibits decreased fluidity during solidification. Thus, it has been found that the densification effect brought about by the addition of $SnO_2$ is very large, which makes it possible to prevent the fine gas from being trapped in the refractory and thereby makes it possible to obtain a refractory having low porosity, large bulk density and high density.

Further, an effect has been found that, during the operation of a glass melting furnace, $SnO_2$ in the glass phase of the refractory moves within the glass phase and moves to the interface between $ZrO_2$ particles and the glass phase, and thereby suppressing the formation of zircon ($ZrO_2 \cdot SiO_2$) crystals which is formed by a reaction of silica ($SiO_2$), which is a main component of the glass phase of the refractory, and zirconia ($ZrO_2$) crystals. The inhibitory effect of $SnO_2$ on zircon crystal formation is observed even in a state in which the refractory is in contact with molten glass, and it has been found that the inhibitory effect of $SnO_2$ on zircon crystal formation is observed even in the case where Na ions and K ions, which are components suppressing zircon crystal formation and easily diffusing into molten glass, are moved from the refractory to the molten glass; further, it has been found that there is an effect of restricting the migration of Na ions and K ions, which have small ion radius, from the refractory to the molten glass.

In addition, $B_2O_3$ is also a critical component of the present invention. $B_2O_3$ is a component which forms borosilicate glass in the glass phase of the refractory together with $SiO_2$. In particular, it is an essential component in the production of a high zirconia fused cast refractory, and an important component having an effect of preventing cracks during production and cracks during temperature rise.

In a conventional high zirconia fused cast refractory having 95% by mass or more of $ZrO_2$ content, since it has a relatively low $SiO_2$ content, it is more difficult to absorb an abrupt volume change of $ZrO_2$ crystals in the vicinity of 1000° C. to 1150° C. as compared to a typical high zirconia electrically-fused cast refractory, and cracking tends to occur during production. Therefore, $B_2O_3$, which is a constituent for forming glass, is introduced in order to form more complicated glass structures than $SiO_2$ alone and thereby promoting the absorption of the abrupt volume change of $ZrO_2$ crystals, so as to prevent cracking at the time of production.

On the other hand, when a small amount of $B_2O_3$ is contained, the formation of zircon crystals may be accelerated, and therefore, it was considered that $B_2O_3$ is preferably used in an amount as small as possible. Therefore, it was difficult to determine the optimum content of $B_2O_3$ in a conventional high zirconia electrically-fused cast refractories having 95% by mass or more of $ZrO_2$.

On the other hand, according to the present invention, as described above, a high zirconia electrically-fused cast refractory having particularly excellent properties is obtained, by adjusting, in a specific composition of the components, the ratio and relationship of two components having conflicting properties, namely, $B_2O_3$ which promotes the formation of zircon crystals and $SnO_2$ which inhibits the formation of zircon crystals. It is considered that, by adjusting $B_2O_3$ and $SnO_2$ to the specific ratio and relationship, the formation of zircon crystals is suppressed and the advantageous aspects of the respective components appear. The advantageous aspects of respective components means the characteristics of $B_2O_3$ which suppresses cracking during production, and the characteristics of $SnO_2$ which provides a dense refractory having low porosity and inhibits the formation of zircon crystals.

In other words, by adjusting these two components having conflicting properties, a glass phase composition capable of suppressing the formation of zircon crystals is provided which, despite the amount thereof being small, can absorb the abrupt volume change of $ZrO_2$ crystals due to temperature change, making it possible to obtain a refractory exhibiting less cracking during production, less zircon crystals at the time of heating, having dense structure and easily mass-produced industrially.

In the present invention, by specifying the range of the respective contents of $SnO_2$ and $B_2O_3$, and further by satisfying the following Formulas (1) and (2), it is possible to provide a refractory exhibiting less cracks at the time of production, having low porosity, having large bulk density, having excellent corrosion resistance, capable of suppressing formation of zircon crystals at the time of heating, and easily mass-produced industrially:

$$0.20 \leq (SnO_2/B_2O_3) < 6.5 \quad (1)$$

$$0.14\% \text{ by mass} \leq (C_{SnO2} + C_{B2O3}/2) \leq 0.55\% \text{ by mass.} \quad (2)$$

In the present invention, an improved evaluation method was adopted as a method for evaluating the performance of the refractory.

There is a positive correlation between the residual volume expansion after heating and the amount of zircon crystals formed, and there is a need for a refractory material in which the residual volume expansion after a thermal cycle test is small and the zircon crystal is hardly formed.

Conventionally, as a method for evaluating zircon crystal formation, a method has been adopted in which a residual volume expansion is measured after a thermal cycle test comprising repeated heat treatments in a temperature range of 800° C. to 1250° C. and a state of zircon crystal formation is determined based on this measured value.

On the other hand, in the present invention, the temperature condition of the thermal cycle test has been reviewed. Specifically, the lower-side temperature has been set to 600° C., which is lower than the glass transition temperature of the glass phase of the refractory (about 800° C.), and the higher-side temperature has been set to 1450° C., which is lower than the dissociation temperature of the zircon crystal (about 1550° C.) and which is a temperature at which the zircon crystal is grown, and thereby the temperature range has been widened, which makes it possible to more accurately evaluate the effect of the zircon suppression even with a small number of heat treatments. This evaluation method is referred to as "thermal cycle test 1" in the present disclosure.

Further, in the evaluation under the condition in contact with the molten glass ("thermal cycle test 2"), the thermal cycle is performed under the condition in which the refractory is in contact with the glass and under the heat treatment condition close to the condition described above. This makes it possible to accelerate the movements of the glass phase component of the refractory and the molten glass component, and thereby making it possible to evaluate the zircon crystal formation in the refractory under the conditions closer to the actual furnace.

Components

Hereinafter, each component of the refractory according to the present invention will be described.

$ZrO_2$

The content of $ZrO_2$ is preferably more than 95% by mass and 98% by mass or less, as mass % in the refractory. The content of $ZrO_2$ is more preferably from 96 to 98% by mass, and still more preferably from 96.5 to 98% by mass.

The content of $ZrO_2$ is preferably 95.2% by mass or more, 95.4% by mass or more, 95.6% by mass or more, 95.8% by mass or more, 96.0% by mass or more, 96.2% by mass or more, 96.4% by mass or more, 96.6% by mass or more, or 96.8% by mass or more, and/or less than 98% by mass, less than 97.5% by mass, or less than 97% by mass.

When the content of $ZrO_2$ is more than 95% by mass, the corrosion resistance may be improved as compared with the conventional refractory. When the content exceeds 98% by mass, the relative amount of the glass phase is reduced and the melt becomes unstable, and as a result, dense products cannot be obtained and cracks tend to occur during the production of a product.

Zirconia raw material and zircon raw material used as raw material for the high zirconia electrically-fused cast refractory inevitably contain 1 to 2% by mass of $HfO_2$. $HfO_2$ is included in the high zirconia electrically-fused refractories since it does not volatilize during production. Further, since it is a stable oxide like zirconia and has the same effect as zirconia, $ZrO_2$+$HfO_2$ content is treated as the $ZrO_2$ content.

$SiO_2$ $SiO_2$ is the main component of the glass phase in the refractory of the present invention.

The content of $SiO_2$ is 1 to 2.5% by mass, as mass % in the refractory. More preferably, the content thereof is 1% by mass or more and less than 2.5% by mass, from 1.5% by mass to 2.5% by mass, or 1.5% by mass or more and less than 2.5% by mass. More preferably, the content thereof is from 2.0% by mass to 2.5% by mass, or 2.0% by mass or more and less than 2.5% by mass.

The content of $SiO_2$ is preferably less than 2.5% by mass, less than 2.50% by mass, 2.49% by mass or less, 2.48% by mass or less, 2.47% by mass or less, 2.46% by mass or less, 2.45% by mass or less, 2.44% by mass % or less, 2.43% by mass or less, or 2.42% by mass or less, as mass % in the refractory.

When the content of $SiO_2$ is less than 1% by mass, the amount of the glass phase to be formed is reduced, which leads to a relatively increased $ZrO_2$ content, and as a result cracking tends to occur since the volume expansion and shrinkage of $ZrO_2$ crystals are not suppressed during the production or at the time of heating in the melting furnace. If the content of $SiO_2$ is too high, it is not easy to ensure more than 95% by mass of $ZrO_2$ content, and as a result the corrosion resistance may be lowered.

$Al_2O_3$ $Al_2O_3$ is a component that lowers the melting temperature of the refractory in the production of a high zirconia electrically-fused cast refractory, and at the same time, that has an effect of suppressing the formation of zircon crystals. If the content is less than 0.1% by mass, the effect is difficult to be obtained. In particular, when the content is less than 0.1% by mass, the melting temperature of the refractory is increased; the viscosity of the melt of the refractory is more rapidly changed; the viscosity of the melt is easily increased due to a decrease in the melt temperature at the time of casting in the mold; and the fluidity of the melt is rapidly deteriorated, and thereby gas tends to be trapped in the refractory, and as a result, dense refractory is not obtained. Therefore, the content of 0.1% by mass or more is desirable, and, under the coexistence of $SnO_2$, gases are further effectively prevented from being trapped in the refractory due to the combined effect of $SnO_2$ described above, making it possible to obtain a dense refractory having low porosity.

Therefore, in the present invention, it is required that $Al_2O_3$ is contained in an amount of 0.10% by mass or more and further $SnO_2$ is contained. In addition, if the content of $Al_2O_3$ exceeds 1.5% by mass, the relative content of $ZrO_2$ decreases and the crystals of corundum and mullite tend to be precipitated in the glass phase at the time of production or heating, resulting in a reduction of the glass phase. These precipitates cause cracks during the production of the high zirconia electrically-fused cast refractory.

Therefore, the content of $Al_2O_3$ is preferably 0.1 to 1.5% by mass, more preferably 0.4 to 1% by mass, 0.65% by mass to 0.95% by mass, still more preferably 0.7 to 0.95% by mass or 0.7 to 0.90% by mass, as mass % in the refractory.

$B_2O_3$ $B_2O_3$ is a component that forms, together with $SiO_2$, borosilicate glass in the glass phase of the refractory, and is one of the critical components of the present invention.

As described above, it was difficult to determine the optimum $B_2O_3$ content in a high zirconia electrically-fused cast refractory having 95% by mass or more of $ZrO_2$ content.

In contrast, in the present invention, the optimum $B_2O_3$ content has been found by allowing $SnO_2$ to coexist.

Incidentally, even under the coexistence of $SnO_2$, it is difficult to suppress the formation of zircon crystals when $B_2O_3$ content exceeds 0.4% by mass. Therefore, $B_2O_3$ content is preferably 0.4% by mass or less.

Consequently, the content of $B_2O_3$ is preferably from 0.02 to 0.4% by mass, more preferably from 0.05 to 0.35% by mass, or from 0.05 to 0.3% by mass, still more preferably from 0.05 to 0.25% by mass, or from 0.10 to 0.25% by mass, or from 0.2 to 0.25% by mass, as mass % in the refractory.

$Na_2O$ and $K_2O$ $Na_2O$ and $K_2O$ have an effect of significantly inhibiting the formation of zircon crystals in the glass phase of the refractory. In the present invention, only one of $Na_2O$ and $K_2O$ may be contained, or both of $Na_2O$ and $K_2O$ may be contained. However, $K_2O$ content can be 0% by mass.

Generally, when the refractory is in contact with molten glass, Na ions and K ions contained in the glass phase of the refractory tend to migrate to the molten glass, and as a result zircon crystals tend to be formed in the glass phase of the refractory. However, when $SnO_2$ is coexisted in an amount specified in the present invention, the effect of $SnO_2$ for inhibiting the formation of zircon crystals can be maintained even if Na ions and K ions move from the refractory to the molten glass. Further, there is an effect of suppressing the migration of Na ions and K ions, which have small ion radius, from the refractory to the molten glass.

Therefore, if $SnO_2$ is coexisted in an amount specified in the present invention, $K_2O$ in particular is not an essential component, and $K_2O$ content may be 0% by mass, preferably from 0 to 0.10% by mass. It is more preferably from 0 to 0.08% by mass, and still more preferably from 0 to 0.05% by mass.

Further, at the time of producing a large product as a refractory for a glass melting furnace, if $Na_2O$ or $K_2O$, which significantly lower the viscosity of the glass phase, are contained in a large amount, large cracks tends to occur which is accompanied by leaching of glass on a corner portion or a wide surface of the product. Therefore, in this case, it is necessary to grind a considerable thickness at the time of production in order to remove cracks, which causes a problem in productivity.

However, in the present invention, by the coexistence of $SnO_2$, it becomes possible to suppress the formation of zircon crystals and to reduce the content of $Na_2O$ and $K_2O$, and thus it is possible to prevent cracks during the production of the high zirconia fused cast refractory and to prevent large cracks with leaching of glass.

If the sum of $Na_2O$ and $K_2O$ exceeds 0.3% by mass, the viscosity of the glass phase is reduced, and cracks or large cracks with leaching of glass tends to occur during the production of the high zirconia fused cast refractory.

Therefore, the sum of $Na_2O$ and $K_2O$ is preferably from 0.01 to 0.3% by mass, more preferably from 0.05 to 0.3% by mass, still more preferably from 0.05 to 0.25% by mass, or from 0.1 to 0.25% by mass, as mass % in the refractory.

$SnO_2$ $SnO_2$ releases $O_2$ through a reduction reaction during temperature rise. By the above-described effect of $SnO_2$, the trapping of gases in the refractory is suppressed, and it is possible to obtain a dense refractory having low porosity and large bulk density. Therefore, it is a very significant component of the present invention.

In addition, during the operation of the glass melting furnace, there is an effect that $SnO_2$ in the glass phase of the refractory migrates within the glass phase and migrates to the interface between $ZrO_2$ particles and the glass phase, which has an effect of inhibiting the formation of zircon ($ZrO_2 \cdot SiO_2$) crystals formed from the reaction of silica ($SiO_2$), which is the main component of the glass phase of the refractory, and zirconia ($ZrO_2$) crystals.

Under a condition where the refractory is in contact with the molten glass, even if Na ions and K ions, which are components that inhibit the formation of zircon crystals and easily diffuse into the molten glass, move from the refractory into the molten glass, $SnO_2$ can still inhibit the formation of zircon crystals. Further, it restricts the migration of Na ions and K ions having small radius from the refractory to the molten glass, so as to retain them in the refractory. Further, even if the content of $B_2O_3$, which is a component that promotes the formation of zircon crystals, is high, the formation of zircon crystals can be suppressed by allowing $SnO_2$ to coexist. On the other hand, if $SnO_2$ content is too high, the refractory is colored and the number of foams in the molten glass is increased.

Therefore, $SnO_2$ content is preferably from 0.01 to 0.4% by mass, as mass % in the refractory. The content thereof is more preferably from 0.05 to 0.35% by mass, even more preferably from 0.1 to 0.35% by mass, from 0.15 to 0.3% by mass, or from 0.2 to 0.25% by mass.

$SnO_2$ and $B_2O_3$

As described above, $B_2O_3$, which promotes the formation of zircon crystals, and $SnO_2$, which suppresses the formation of zircon crystals, are the two components having conflicting properties, but are essential components in the present invention. By adjusting the ratio and relationship of these components as follows, an excellent high zirconia electrically-fused cast refractory can be obtained. In this case, it is considered that the formation of zircon crystals is suppressed, and, as the advantageous properties of the respective components, $B_2O_3$ exhibits the characteristics of suppressing cracks during production and $SnO_2$ exhibits the characteristics of lowering the porosity and promoting the densification.

Specifically, when $SnO_2$ and $B_2O_3$, which are contained in the range described above, satisfy Formula (1) and the relationship of Formula (2), it is possible to obtain a refractory having excellent characteristics. It is more preferable that $SnO_2$ and $B_2O_3$ satisfy Formula (3) and the relationship of Formula (4). It is further preferred that $SnO_2$ and $B_2O_3$ satisfy Formula (5) and the relationship of Formula (6).

$$0.20 \leq (SnO_2/B_2O_3) < 6.5 \quad (1)$$

$$0.14\% \text{ by mass} \leq (C_{SnO2+}C_{B2O3}/2) \leq 0.55\% \text{ by mass.} \quad (2)$$

$$0.40 \leq (SnO_2/B_2O_3) < 4.5 \quad (3)$$

$$0.16\% \text{ by mass} \leq (C_{SnO2} + C_{B2O3}/2) \leq 0.45\% \text{ by mass} \quad (4)$$

$$0.60 \leq (SnO_2/B_2O_3) < 4.0 \quad (5)$$

$$0.18\% \text{ by mass} \leq (C_{SnO2} + C_{B2O3}/2) \leq 0.40\% \text{ by mass} \quad (6)$$

(in the above Formulas, $C_{SnO2}$ represents the content of $SnO_2$, and $C_{B2O3}$ represents the content of $B_2O_3$, expressed in mass % in the refractory.)

Note that "$SnO_2$" and "$B_2O_3$" in the Formulas (1), (3) and (5) represent the content of $SnO_2$ and the content of $B_2O_3$, respectively, and are expressed by mass % in the refractory (i.e., they have the same meaning as "$C_{SnO2}$" and "$C_{B2O3}$", respectively).

When the composition has a range satisfying the above conditions, cracks do not occur in the refractory at the time of production or cracks are minute, the porosity of the refractory is reduced and the density increases, and it is possible to suppress the zircon formation, resulting in relatively easy industrial production. Thus, $B_2O_3$ and $SnO_2$ are very important components.

BaO

BaO is effective in reducing the viscosity of the melt at the time of melting the blended raw material, forming a stable glass phase in the refractory, and suppressing the formation of zircon crystals in the glass phase of the refractory.

Furthermore, as is the case of $Na_2O$ and $K_2O$, $SnO_2$ has an effect of suppressing the migration of Ba ions from the refractory to the molten glass.

When BaO content is 0.01% by mass or more, formation of zircon crystals can be suppressed. When the content thereof is more than 0.6% by mass, Ba ions tends to migrate from the refractory to the molten glass, and resulting in a relative reduction of $ZrO_2$ content.

Therefore, BaO content is preferably from 0.01 to 0.6% by mass or from 0.1 to 0.6% by mass, as mass % in the refractory. More preferably, the content thereof is from 0.1 to 0.5% by mass, from 0.1 to 0.4% by mass, or from 0.1 to 0.3% by mass. Further preferably, the content thereof is from 0.15 to 0.5% by mass, from 0.15 to 0.4% by mass, or from 0.15 to 0.3% by mass.

$Fe_2O_3$ and $TiO_2$ $Fe_2O_3$ and $TiO_2$ are impurities in $ZrO_2$ raw material. Since these oxides cause coloration and/or foaming of molten glass, the content of these oxides needs to be limited. The content of $Fe_2O_3$ and $TiO_2$ is preferably 0.3% by mass or less, more preferably 0.2% by mass or less, as mass % in the refractory.

CuO

Since CuO is a component that colors glass, the refractory of the present invention is preferably substantially free of CuO. In the present invention, "substantially free" is defined as a content of less than 0.01% by mass. Therefore, the content of CuO is preferably less than 0.01% by mass, as mass % in the refractory.

$P_2O_5$ $P_2O_5$ is one of the components constituting the glass, and has effects of producing glass having low melting point and adjusting the viscosity of the melt during the production of a high zirconia electrically-fused cast refractory. However, when $P_2O_5$ is contained, the formation of zircon crystals is significantly promoted. Therefore, it is preferable that the refractory according to the present invention is substantially free of $P_2O_5$.

Since $P_2O_5$ is present as an impurity in $ZrO_2$ raw material, care must be taken in selecting the raw material. In the present invention, although it is not added intentionally, the content thereof is 0.04% by mass or less, as mass % in the refractory, and the refractory is preferably substantially free of $P_2O_5$.

MgO

MgO, when contained in glass, can reduce the viscosity of the melt of the high zirconia electrically-fused cast refractory and contribute to the formation of a stable glass phase. However, since it promotes the formation of zircon crystals, it is preferable that the refractory according to the present invention is substantially free of MgO.

Since MgO is present as an impurity in $ZrO_2$ raw material, care must be taken in selecting the raw material. In the present invention, although it is not added intentionally, the content thereof is preferably 0.05% by mass or less, as mass % in the refractory, and more preferably, the refractory is substantially free of MgO.

CaO

CaO, when contained in glass in a certain amount, can reduce the viscosity of the melt of the high zirconia electrically-fused cast refractory, and contribute to the formation of a stable glass phase. However, care must be taken since it promotes the formation of zircon crystals when it is contained in excess amount. Since CaO is present as an impurity of $ZrO_2$ raw material, it is contained in the refractory in a certain amount. However, it may be separately added depending on the purity of the raw material.

Therefore, CaO content is preferably from 0.01% by mass to 0.2% by mass, more preferably from 0.01% by mass to 0.15% by mass, still more preferably from 0.01% by mass to 0.1% by mass, as mass % in the refractory.

Porosity

The porosity of the refractory is preferably 1.5% or less. The lower the porosity, the better the corrosion resistance. More preferably, the porosity is 1.4% or less, 1.3% or less, 1.2% or less, 1.1% or less, 1.0% or less, 0.9% or less, 0.8% or less, or 0.7% or less. When the porosity of the refractory exceeds 1.5%, the corrosion resistance is remarkably reduced. The porosity is preferably as low as possible, and the lower limit thereof is not particularly limited, but may be, for example, 0.01% or more, or 0.1% or more.

The porosity of the refractory is measured by the Archimedes method in a sample extracted from the refractory.

Bulk Density

The bulk density of the refractory is preferably 5.40 $g/cm^3$ or more, more preferably 5.50 $g/cm^3$ or more, and even more preferably 5.60 $g/cm^3$ or more. The larger the bulk density, the better the corrosion resistance. Therefore, the upper limit of the bulk density is not particularly limited, but may be, for example, 5.75 $g/cm^3$ or less or 5.70 $g/cm^3$ or less. The bulk density of the refractory is preferably 5.45 to 5.65 $g/cm^3$ or 5.50 to 5.65 $g/cm^3$. If the bulk density is below 5.40 $g/cm^3$, it is the same level as the typical high zirconia electrically-fused cast refractories.

The bulk density of the refractory is measured by the Archimedes method in a sample extracted from the refractory.

EXAMPLES

The high zirconia electrically-fused cast refractory according to a preferred embodiment of the present invention will be described below. The present invention is not limited thereto.

Examples 1 to 17, Comparative Examples 18 to 27, and Reference Examples 1 to 5

The refractories according to Examples 1 to 17, Comparative Examples 18 to 27, and Reference Examples 1 to 5 were produced, and the physical properties thereof, etc., were evaluated.

Production of Refractory

To a $ZrO_2$ raw material obtained by desiliconizing zircon sand, raw materials containing oxides such as $SiO_2$, $Al_2O_3$, $Na_2O$, $K_2O$, $B_2O_3$, BaO, $SnO_2$, and nitrates are blended so as to obtain a predetermined ratio in terms of oxide, and these raw materials were mixed and then melted in an electric arc furnace. After melting for a predetermined time, it was casted into a mold, and slowly cooled to room temperature by burying it in a silica sand as an annealing material together with the mold.

The mold was made of graphite, and the dimension of an article portion of the mold was 100 mm×300 mm×300 mm, and to the upper portion thereof, a hot-top part having the inner dimension of 140 mm×235 mm×350 mm was integrally connected.

After cooling, the mold and the cast were removed from the silica sand as the annealing material, and then the mold and the cast were separated. The product portion of the cast was separated from the hot-top portion, in order to obtain the desired high zirconia electrically-fused cast refractory.

Evaluation

The refractories according to Examples 1 to 17, Comparative Examples 18 to 27, and Reference Examples 1 to 5 thus produced were evaluated for physical properties, etc., as described below. The compositions and properties of the high zirconia electrically-fused cast refractories of Examples 1 to 17 are shown in Table 1. The compositions and properties of the high zirconia electrically-fused cast refractories of Comparative Examples 18 to 27 and Reference Examples 1 to 5 are shown in Table 2. The content of each component in Tables 1 and 2 are shown in unit of mass %.

Component Analysis

Analysis of each component was performed by wavelength dispersive X-ray fluorescence method. $B_2O_3$ content was quantitatively analyzed by high-frequency inductively coupled plasma emission spectrometry. However, the present invention is not limited to these analytical methods, and other analytical methods may be used.

Cracks

Cracks at the time of production were evaluated by observing the state of the product after the demolding without finishing the surface, in order to determine the presence or absence of cracks. When a refractory had no cracks, it was judged as "no"; when a refractory had a crack having up to 2 mm width and up to 50 mm length, it was judged as "minute"; and when a refractory had a larger crack, it was judged "yes".

Bulk Density and Porosity

Bulk density and porosity were measured as follows: on a 300 mm×300 mm surface, at positions 50 mm, 100 mm from the mold-contacting bottom surface and 50 mm, 150 mm, 250 mm from the mold-contacting side surface, a total of six drilled cores having 20 mm diameter were extracted, and the bulk density and the apparent porosity of the samples having 80 mm length were measured according to Archimedes method 10 mm interior from the casting surface, and then the average value thereof were calculated.

Corrosion Resistance

As a sample for evaluating the corrosion resistance, a drilled core of 20 mm diameter was extracted on a 300 mm×300 mm surface at a position 50 mm from each of the mold-contacting bottom surface and the mold-contacting side surface, and then the 5 mm casting surface was cut, in order to prepare a sample having 90 mm length.

FIG. 1 shows a diagram of an apparatus used for evaluation of corrosion resistance. The corrosion resistance was evaluated as follows.

Holes were made in a sample to be evaluated and in an alumina guide tube for fixing the sample, and a refractory pin was inserted, in order to fix the sample to be evaluated to the alumina guide tube. The refractory pin and the alumina guide tube were fixed using a heat-resistant adhesive. One end of the alumina guide tube was connected to the sample to be evaluated, and the other end was connected to the test device.

A crucible (reference number 3 in FIG. 1) of the high-zirconia electrically-fused cast refractory containing liquid crystal glass (reference number 2 in FIG. 1) was heated to a temperature of 1700° C., and then the test device connected to the alumina guide tube was started, and the sample to be evaluated was rotated at 40 rpm. Samples (reference number 1 in FIG. 1) rotating at 40 rpm were contacted with the liquid crystal glass heated to 1700° C. (reference number 2 in FIG. 1). The liquid crystal glass was contacted with the sample to be evaluated at temperature of 1700° C. for 168 hours, and thereafter the sample was recovered from the crucible of the refractory and the glass adhered to the sample to be evaluated was removed.

For the recovered sample, the amount of erosion by the glass was measured at the most eroded portion using a caliper. FIG. 2 shows the appearance of the actual samples after the corrosion resistance test.

For comparison, the amount of erosion measured in a high zirconia electrically-fused cast refractory having 93% by mass of $ZrO_2$ was used as a standard erosion amount, and the erosion amount was evaluated on the basis of the following criteria.

Very good: The amount of erosion is less than the standard

Good: The amount of erosion is the same as the standard

Poor: The amount of erosion is more than the standard

Residual Volume Expansion after Thermal Cycle Test 1

On a 300 mm×300 mm surface, at a position 50 mm from each of the mold-contacting bottom surface and the mold-contacting side surface, a drilled core of 45 mm diameter was extracted and 25 mm of each casting surface was cut, in order to prepare an evaluation sample having 50 mm length.

The sample was heated to 600° C. at a heating rate of 3° C./min and held for 1 hour. Thereafter, the temperature was raised to 1450° C. at a heating rate of 3° C./min, and held at 1450° C. for 1 hour. After holding for 1 hour, the temperature was lowered to 600° C. at a cooling rate of 3° C./min, and held for 1 hour. The heat cycle is repeated 20 times, wherein one cycle consists of holding at 600° C. for 1 hour and holding at 1450° C. for 1 hour. After repeating the thermal cycles 20 times, the residual volume expansion was calculated from the difference in the volume of the evaluation sample, which was determined from the dimensions measured before and after the heating.

The residual volume expansion calculated in this way was evaluated on the basis of the following criteria.

Very good: The residual volume expansion was 5% or less

Good: The residual volume expansion was 5% to 20%

Poor: The residual volume expansion exceeded 20%

Residual Volume Expansion after Thermal Cycle Test 2

A cubic sample of 100 mm×100 mm×100 mm was cut out with respect to the mold-contacting bottom surface and the mold-contacting side surface, and a drilled core having 50 mm diameter was extracted therefrom using a drill at the center of the sample to the depth of 70 mm, in order to prepare a crucible of the high zirconia electrically-fused cast refractory, which was used as a sample for thermal cycle test 2. In order to eliminate any effect of the metal component from drilling, the test was carried out after acid cleaning.

The refractory crucible was filled with about 230 g of liquid crystal glass crushed to about 1 mm to 3 mm fragments. The crucible was heated to 800° C. at a heating rate of 3° C./min, and held for 3 hours. Thereafter, the temperature was raised to 1450° C. at the same heating rate, and held for 3 hours. Next, the temperature was lowered to 800° C. at a cooling rate of 3° C./min. The heating cycle was repeated 10 times, wherein one heating cycle consisted of holding at 800° C. for 3 hours and holding at 1450° C. for 3 hours. Thereafter, the residual volume expansion was calculated from the difference in volume of the refractory crucible, which was determined from the dimensions measured before and after heating.

The residual volume expansion calculated in this way was evaluated on the basis of the following criteria.

Very good: The residual volume expansion was 5% or less

Good: The residual volume expansion was 5% to 20%

Poor: The residual volume expansion was more than 20%

The liquid crystal glass used for this test was alkali-free glass having 60% by mass of $SiO_2$, 15% by mass of $Al_2O_3$, 7% by mass of CaO, 7% by mass of SrO, 7% by mass of $B_2O_3$, 1% by mass of MgO, and 3% by mass of BaO.

Evaluation Results

Examples 1 to 17

As can be seen in Table 1, the high zirconia electrically-fused cast refractories of Examples 1 to 17 had more than 95% by mass and 98% or less of $ZrO_2$, from 0.1 to 1.5% by mass of $Al_2O_3$, from 1 to 2.5 mass % of $SiO_2$, from 0 to 0.1% by mass of $K_2O$, from 0.01 to 0.3% by mass of $Na_2O$ and $K_2O$ in total, from 0.02 to 0.4% by mass of $B_2O_3$, from 0.01 to 0.6% by mass of BaO, from 0.01 to 0.4% by mass of $SnO_2$, 0.3% by mass or less of $Fe_2O_3$ and $TiO_2$ in total, 0.04% by mass or less of $P_2O_5$, and the contents of $B_2O_3$ and $SnO_2$ satisfied the following Formulas (1) and (2):

$$0.20 \leq (SnO_2/B_2O_3) < 6.5 \quad (1)$$

$$0.14\% \text{ by mass} \leq (C_{SnO2} + C_{B2O3}/2) \leq 0.55\% \text{ by mass.} \quad (2)$$

(wherein in Formula (2), $C_{SnO2}$ represents the content of $SnO_2$, and $C_{B2O3}$ represents the content of $B_2O_3$, expressed in mass % in the refractory.)

and the refractories of Examples 1 to 17 exhibited “minute” or “no” cracks during production, achieved 1.5% or less of porosity, and exhibited less cracks even after the thermal cycle tests, indicating that the formation of zircon crystals was suppressed. Furthermore, since these refractories have large bulk density, they are excellent in corrosion resistance.

Comparative Examples 18 to 27

Comparative Example 18 is substantially free of $SnO_2$. As seen in Table 2, the refractory of Comparative Example 18 was inferior in terms of crack formation, residual volume expansion, and corrosion resistance, and had a relatively low bulk density and relatively high porosity.

Without wishing to be bound by theory, it is considered that since the refractory of Comparative Example 18 does not contain $SnO_2$, the effect of releasing the gas trapped in the refractory prior to solidification was not available, and thus the porosity was increased and the erosion amount was increased. Further, it is considered that since it is substantially free of $SnO_2$, the effect of $SnO_2$ for suppressing the formation of zircon crystals was not available, and thus the residual volume expansion was relatively high in thermal cycle tests 1 and 2. Although the exact reason for the occurrence of cracking is not clear, this may due to the fact that the relationship between $SnO_2$ content and $B_2O_3$ content was not optimized, or that $SnO_2$ was absent.

In Comparative Example 19, $B_2O_3$ content was more than 0.4% by mass. As can be seen in Table 2, the refractory of Comparative Example 19 was inferior in terms of the residual volume expansion after thermal cycle tests 1 and 2.

Without wishing to be bound by theory, it is considered that in the refractory of Comparative Example 19, cracking at the time of production was suppressed due to the inclusion of $B_2O_3$, and low porosity was obtained due to the inclusion of $SnO_2$. However, in the refractory of Comparative Example 19, it is considered that the effect of promoting the formation of the zircon crystal, which is the effect of $B_2O_3$, was larger than the effect of inhibiting the formation of the zircon crystal, which is the effect of $SnO_2$, and as a result, the residual volume expansion was increased in thermal cycle tests 1 and 2.

In Comparative Examples 20 to 21, the total content of $Na_2O$ and $K_2O$ was more than 0.3% by mass, and the content of $B_2O_3$ was 0.01% by mass. Further, in Comparative Example 20, $SiO_2$ was 2.68% by mass. As can be seen in Table 2, the refractories of Comparative Examples 20 and 21 were inferior in terms of crack formation.

Without wishing to be bound by theory, it is considered that since the refractories of Comparative Examples 20 and 21 contained $SnO_2$, the residual volume expansion was lower in thermal cycle tests 1 and 2; however, it is considered that since they contained insufficient amount of $B_2O_3$, cracking occurred at the time of production.

In Comparative Example 22, the total of $Na_2O$ and $K_2O$ was more than 0.3% by mass, the content of $B_2O_3$ was 0.01% by mass, and the content of $P_2O_5$ was more than 0.04% by mass. As can be seen in Table 2, the refractory of Comparative Example 22 was inferior in terms of crack formation and the residual volume expansion after thermal cycles 1 and 2.

Without wishing to be bound by theory, it is considered that since the refractory of Comparative Example 22 contained a higher amount of $P_2O_5$, the formation of zircon crystals was facilitated, and as a result, the residual volume expansion was increased in thermal cycle tests 1 and 2. In addition, it is considered that since the refractory of Comparative Example 22 contained insufficient amount of $B_2O_3$, cracking occurred at the time of production.

Comparative Example 23 was substantially free of $SnO_2$. Comparative Example 23 is a composition corresponding to Patent Document 7 (JP-2014-129199A). As can be seen in Table 2, the refractory of Comparative Example 23 was inferior in terms of crack formation, residual volume expansion after thermal cycles 1 and 2, and corrosion resistance, and had relatively low bulk density and relatively high porosity.

Here, reference is made to FIG. 2, in order to explain the corrosion resistance of Comparative Example 23. FIG. 2 is a photograph showing the appearance of a refractory of 93% by mass of zirconia (reference number 4), the refractory of Comparative Example 23 (reference number 5), and the refractory of Example 5 (reference number 6) after the corrosion resistance test, respectively. As can be seen in FIG. 2, the refractory of Comparative Example 23 exhibited relatively large porosity and relatively large degree of erosion. It is considered that this was due to the fact that it was substantially free of $SnO_2$.

Further, it is considered that since the refractory of Comparative Example 23 was substantially free of $SnO_2$, it was not possible to suppress the formation of zircon crystals in thermal cycle tests 1 and 2, resulting in larger residual volume expansion. Although the exact reason for cracking formation was not clear, this may be due to the fact that the relationship between $SnO_2$ content and $B_2O_3$ content was not optimized, or that $SnO_2$ was absent.

In Comparative Example 24, the content of $Fe_2O_3$ and $TiO_2$ in total was more than 0.3% by mass. As can be seen in Table 2, the refractory of Comparative Example 24 was inferior in terms of residual volume expansion after thermal cycles 1 and 2.

Since the refractory of Comparative Example 24 had low porosity and higher amount of $Fe_2O_3$+$TiO_2$, the molten glass was colored and a large number of bubbles were generated at the interface between the refractory and the glass during thermal cycle test 2. Further, it is considered that since the inclusion of these impurities in large amount have an effect of promoting the formation of zircon crystals, residual volume expansion was increased after thermal cycle tests 1 and 2 in the refractory of Comparative Example 24.

In Comparative Example 25, $B_2O_3$ content was in the range from 0.02 to 0.4% by mass, and $SnO_2$ content was in the range of from 0.01 to 0.4% by mass; on the other hand, the content of $SnO_2$ and $B_2O_3$ was more than 0.55% by mass with regard to Formula (2). As can be seen in Table 2, the refractory of Comparative Example 25 was inferior in terms of residual volume expansion after thermal cycle tests 1 and 2.

Without wishing to be bound by theory, it is considered that in the refractory of Comparative Example 25, cracking at the time of production was suppressed due to the inclusion of $B_2O_3$, and the porosity was reduced due to the inclusion of $SnO_2$. However, in the refractory of Comparative Example 25, it is considered that since the relationship between $SnO_2$ content and $B_2O_3$ content was not optimized, the residual volume expansion was increased in thermal cycle tests 1 and 2.

In Comparative Example 26, the content of $B_2O_3$ was in the range from 0.02 to 0.4% by mass, the content of $SnO_2$ was in the range from 0.01 to 0.4% by mass, and the content of $SnO_2$ and $B_2O_3$ satisfied Formula (2), but the ratio of $SnO_2$ content and $B_2O_3$ content was out of the range of Formula (1). In addition, $SiO_2$ content was less than 1%. As can be seen in Table 2, the refractory of Comparative Example 26 was inferior in terms of crack formation and residual volume expansion after thermal cycle tests 1 and 2.

Without wishing to be bound by theory, in the refractory of Comparative Example 26, it is considered that since $SiO_2$ content was insufficient and the ratio of $SnO_2$ and $B_2O_3$ did not satisfy Formula (1), it was not possible to mitigate the stress generated by the volume change caused by the transformation of $ZrO_2$ crystals, and thus cracking occurred during production. Further, it is considered that since $SiO_2$ content was insufficient, the zircon crystals were generated in a small amount irrespective of the effect of $SnO_2$ for inhibiting the zircon crystal formation, and as a result, $SiO_2$, which was contained in relatively small amount, was used for the formation of the zircon crystal, and the reduction of the glass phase of the refractory, which is mainly composed of $SiO_2$, was facilitated, and consequently the residual volume expansion was increased in thermal cycle tests 1 and 2.

In Comparative Example 27, $B_2O_3$ content was in the range from 0.02 to 0.4% by mass, the content of $SnO_2$ was in the range from 0.01 to 0.4% by mass, and the ratio of $SnO_2$ content and $B_2O_3$ content satisfied Formula (1); however, the contents of $SnO_2$ and $B_2O_3$ did not satisfy the relationship of Formula (2). As can be seen in Table 2, the refractory of Comparative Example 27 had relatively large porosity and was inferior in terms of the residual volume expansion after thermal cycle test 2.

Without wishing to be bound by theory, in the refractory of Comparative Example 27, it is considered that since the relationship between $SnO_2$ content and $B_2O_3$ content was not optimized, residual volume expansion was increased in thermal cycle test 2.

Reference Examples 1 to 5

Reference Examples 1 to 5 are refractories which contain 95% by mass or less of $ZrO_2$.

Reference Example 1 was substantially free of $SnO_2$ and contained more than 1.5% by mass of $Al_2O_3$. As can be seen in Table 2, the refractory of Reference Example 1 was inferior in terms of crack formation, residual volume expansion after thermal cycle tests 1 and 2, and corrosion resistance. Further, it exhibited relatively low bulk density and relatively high porosity.

Without wishing to be bound by theory, it is considered that since the refractory of Reference Example 1 was substantially free of $SnO_2$, the porosity was increased and the degree of erosion was increased. Further, it is considered that since the refractory of Reference Example 1 contained relatively large amount of $Al_2O_3$, mullite ($3Al_2O_3 \cdot 2SiO_2$) crystals were generated by a reaction between alumina ($Al_2O_3$) and silica ($SiO_2$) which is the main component of the corundum crystal or glass phase, and the glass phase was decreased, which made it difficult to absorb the abrupt volume change of $ZrO_2$ crystals in the vicinity 1000° C. to 1150° C., and as a result, residual volume expansion was increased in thermal cycle tests 1 and 2.

In addition, in the refractory of Reference Example 1, it is considered that since Na, K, and Ba ions easily migrated into the molten glass, it was difficult to suppress the formation of zircon crystals, and consequently, the residual volume expansion was increased in the thermal cycle test 2.

Reference Example 2 contained more than 0.6% by mass of BaO. As can be seen in Table 2, the refractory of Reference Example 2 was inferior in terms of crack formation and the residual volume expansion after thermal cycle 2.

Without wishing to be bound by theory, although BaO reduces the fluidity of the melt, if BaO is contained in large amount, it easily migrates from the refractory to the molten glass, which makes it difficult to suppress the formation of zircon crystals. Therefore it is considered that, as a result of which, the residual volume expansion was increased in thermal cycle test 2 in the refractory of Reference Example 2.

Reference Example 3 contained more than 1.5% by mass of $Al_2O_3$ and more than 0.4% by mass of $B_2O_3$. Further, in Reference Example 3, $B_2O_3$ content and $SnO_2$ content were more than 0.55% by mass in Formula (1). Further, Reference Example 3 contained more than 0.2% by mass of CaO. As can be seen in Table 2, the refractory of Reference Example 3 was inferior in terms of the residual volume expansion after thermal cycle tests 1 and 2.

In the refractory of Reference Example 3, it is considered that cracking at the time of production was suppressed due to the inclusion of $B_2O_3$, and the porosity was lowered due to the inclusion of $SnO_2$. However, in the refractory of Reference Example 3, it is considered that the effect of $B_2O_3$ for promoting the zircon crystal formation was larger than the effect of $SnO_2$ for inhibiting the zircon crystal formation, and consequently, the residual volume expansion was increased in thermal cycle tests 1 and 2.

Further, it is considered that in the refractory of Reference Example 3, since $Al_2O_3$ content was relatively high, mullite ($3Al_2O_3 \cdot 2SiO_2$) crystals were generated by a reaction between alumina ($Al_2O_3$) and silica ($SiO_2$) which is the main component of the corundum crystal or the glass phase, and the glass phase was decreased, which made it difficult to absorb the abrupt volume change of $ZrO_2$ crystals in the vicinity 1000° C. to 1150° C., and as a result, the residual volume expansion was increased in thermal cycle tests 1, 2.

In Reference Example 4, the total content of $Na_2O$ and $K_2O$ was more than 0.3% by mass, the content of MgO was more than 0.05% by mass, and the content of $B_2O_3$ was 0.01% by mass. As can be seen in Table 2, the refractory of Reference Example 4 was inferior in terms of crack formation and the residual volume expansion after thermal cycles 1 and 2.

Without wishing to be bound by theory, in the refractory of Reference Example 4, it is considered that the effect of MgO for promoting the zircon crystal formation was larger than the effect of $SnO_2$ and $Na_2O$ for inhibiting the zircon crystal formation, and consequently, the residual volume expansion was increased in thermal cycle tests 1 and 2. In addition, it is considered that since the content of $B_2O_3$ was insufficient in the refractory of Reference Example 4, cracking occurred at the time of production.

Reference Example 5 contained more than 2.5% by mass of $SiO_2$, and was substantially free of $SnO_2$. As can be seen in Table 2, the refractory of Reference Example 5 was inferior in terms of the residual volume expansion after thermal cycle 2, and had relatively low bulk density.

The refractory of Reference Example 5 did not contain $SnO_2$. However, it is considered that when $SiO_2$ content is 3.5% by mass or more, the fluidity of the melt is improved and the porosity in the refractory can be lowered. Further, although the refractory of Reference Example 5 was substantially free of $SnO_2$, it is considered that since $SiO_2$ content was relatively large, the glass phase of the refractory, which is mainly composed of $SiO_2$, was retained even if the zircon crystal was generated in thermal cycle test 1, and absorbed the abrupt volume change of $ZrO_2$ crystals due to the temperature change, and as a result, the residual volume expansion was reduced.

However, it is considered that since the refractory of Reference Example 5 was substantially free of $SnO_2$, Na ions, K ions and Ba ions migrated to the molten glass in thermal cycle test 2, and the formation of zircon crystal was promoted, and as a result the residual volume expansion was increased. Further, it is considered that since the refractory of Reference Example 5 contained relatively large amount of $SiO_2$, $ZrO_2$ content was relatively reduced, and consequently, corrosion resistance was the same as the standard.

TABLE 1

| Examples | | 1 | 2 | 3 | 4 | 5 | 6 | 7 | 8 | 9 |
|---|---|---|---|---|---|---|---|---|---|---|
| Chemical | $ZrO_2 + HfO_2$ | 95.24 | 95.80 | 96.23 | 96.03 | 96.00 | 96.27 | 96.61 | 96.81 | 95.22 |
| Composition | $SiO_2$ | 2.48 | 2.20 | 2.18 | 2.14 | 1.88 | 1.75 | 1.55 | 1.50 | 2.50 |
| (% by weight) | $Al_2O_3$ | 0.95 | 0.85 | 0.77 | 0.61 | 0.87 | 0.84 | 0.76 | 0.72 | 0.98 |
| | $Na_2O$ | 0.13 | 0.08 | 0.16 | 0.15 | 0.14 | 0.17 | 0.15 | 0.05 | 0.15 |
| | $K_2O$ | 0.02 | 0.02 | 0.02 | 0.01 | 0.01 | 0.04 | 0.05 | 0.00 | 0.02 |
| | $B_2O_3$ | 0.14 | 0.12 | 0.05 | 0.20 | 0.26 | 0.26 | 0.24 | 0.23 | 0.20 |
| | CaO | 0.05 | 0.05 | 0.05 | 0.04 | 0.15 | 0.04 | 0.06 | 0.04 | 0.07 |
| | BaO | 0.50 | 0.40 | 0.20 | 0.49 | 0.29 | 0.20 | 0.18 | 0.19 | 0.55 |
| | $Fe_2O_3 + TiO_2$ | 0.17 | 0.18 | 0.18 | 0.18 | 0.20 | 0.18 | 0.17 | 0.18 | 0.17 |
| | $SnO_2$ | 0.32 | 0.30 | 0.16 | 0.15 | 0.20 | 0.25 | 0.23 | 0.28 | 0.12 |
| | $P_2O_5$ | <0.01 | <0.01 | <0.01 | <0.01 | <0.01 | <0.01 | <0.01 | <0.01 | 0.02 |
| | MgO | <0.01 | <0.01 | <0.01 | <0.01 | <0.01 | <0.01 | <0.01 | <0.01 | <0.01 |
| $Na_2O + K_2O$ | | 0.15 | 0.10 | 0.18 | 0.16 | 0.15 | 0.21 | 0.20 | 0.05 | 0.17 |
| $SnO_2/B_2O_3$ | | 2.29 | 2.50 | 3.20 | 0.75 | 0.77 | 0.96 | 0.96 | 1.22 | 0.60 |
| $C_{SnO2} + C_{B2O3}/2$ | | 0.39 | 0.36 | 0.19 | 0.25 | 0.33 | 0.38 | 0.35 | 0.40 | 0.22 |
| Cracks during production | | No | No | No | No | No | No | No | No | Minute |
| Thermal Cycle 1 Residual volume expansion | | Very Good | Very Good | Very Good | Very Good | Very Good | Very Good | Very Good | Very Good | Very Good |
| Thermal Cycle 2 Residual volume expansion | | Very Good | Very Good | Very Good | Very Good | Very Good | Very Good | Very Good | Very Good | Very Good |
| Bulk density [g/cm$^3$] | | 5.46 | 5.49 | 5.53 | 5.45 | 5.50 | 5.53 | 5.54 | 5.52 | 5.43 |
| Porosity [%] | | 0.7 | 0.8 | 0.7 | 1.2 | 0.8 | 0.7 | 0.8 | 1.4 | 0.8 |
| Corrosion resistance | | Very Good | Very Good | Very Good | Good Very | Very Good | Very Good | Very Good | Very Good | Very Good |

| Examples | | 10 | 11 | 12 | 13 | 14 | 15 | 16 | 17 |
|---|---|---|---|---|---|---|---|---|---|
| Chemical | $ZrO_2 + HfO_2$ | 95.88 | 96.45 | 96.57 | 96.34 | 96.99 | 97.32 | 95.28 | 96.69 |
| Composition | $SiO_2$ | 1.92 | 1.88 | 1.56 | 1.45 | 1.05 | 1.11 | 1.92 | 2.01 |
| (% by weight) | $Al_2O_3$ | 0.90 | 0.41 | 0.81 | 0.66 | 0.76 | 0.65 | 1.46 | 0.18 |
| | $Na_2O$ | 0.15 | 0.18 | .18 | 0.04 | 0.16 | 0.05 | 0.15 | 0.20 |
| | $K_2O$ | 0.01 | 0.06 | .08 | 0.02 | 0.00 | 0.01 | 0.04 | 0.06 |
| | $B_2O_3$ | 0.23 | 0.07 | 0.20 | 0.31 | 0.24 | 0.22 | 0.22 | 0.04 |
| | CaO | 0.06 | 0.05 | 0.04 | 0.05 | 0.16 | 0.08 | 0.06 | 0.06 |
| | BaO | 0.22 | 0.44 | 0.30 | 0.56 | 0.20 | 0.13 | 0.46 | 0.33 |
| | $Fe_2O_3 + TiO_2$ | 0.19 | 0.18 | 0.19 | 0.19 | 0.19 | 0.19 | 0.17 | 0.18 |
| | $SnO_2$ | 0.40 | 0.28 | 0.07 | 0.38 | 0.22 | 0.24 | 0.24 | 0.25 |
| | $P_2O_5$ | <0.01 | <0.01 | <0.01 | <0.01 | 0.03 | <0.01 | <0.01 | <0.01 |
| | MgO | 0.04 | <0.01 | <0.01 | <0.01 | <0.01 | <0.01 | <0.01 | <0.01 |
| $Na_2O + K_2O$ | | 0.16 | 0.24 | 0.26 | 0.06 | 0.16 | 0.06 | 0.19 | 0.26 |
| $SnO_2/B_2O_3$ | | 1.74 | 4.00 | 0.35 | 1.23 | 0.92 | 1.09 | 1.09 | 6.25 |
| $C_{SnO2} + C_{B2O3}/2$ | | 0.52 | 0.32 | 0.17 | 0.54 | 0.34 | 0.35 | 0.35 | 0.27 |
| Cracks during production | | No | No | Minute | Minute | No | No | Minute | Minute |
| Thermal Cycle 1 Residual volume expansion | | Good | Very Good | Good | Good | Good | Good | Very Good | Good |
| Thermal Cycle 2 Residual volume expansion | | Good | Good | Good | Good | Good | Good | Good | Good |
| Bulk density [g/cm$^3$] | | 5.46 | 5.49 | 5.53 | 5.47 | 5.53 | 5.61 | 5.43 | 5.51 |
| Porosity [%] | | 1.5 | 1.1 | 0.9 | 1.5 | 1.4 | 1.3 | 0.9 | 1.5 |
| Corrosion resistance | | Very Good | Very Good | Very Good | Very Good | Very Good | Very Good | Very Good | Very Good |

TABLE 2

| | | Comparative Examples | | | | | | | |
|---|---|---|---|---|---|---|---|---|---|
| | | 18 | 19 | 20 | 21 | 22 | 23 | 24 | 25 |
| Chemical Composition (% by weight) | $ZrO_2 + HfO_2$ | 95.63 | 96.70 | 95.09 | 95.32 | 95.16 | 97.65 | 95.61 | 96.14 |
| | $SiO_2$ | 2.49 | 1.14 | 2.68 | 2.42 | 2.31 | 1.40 | 2.04 | 1.35 |
| | $Al_2O_3$ | 1.04 | 0.67 | 0.88 | 0.94 | 0.93 | 0.50 | 0.89 | 0.89 |
| | $Na_2O$ | 0.15 | 0.05 | 0.35 | 0.24 | 0.30 | 0.14 | 0.15 | 0.10 |
| | $K_2O$ | 0.02 | 0.00 | 0.04 | 0.12 | 0.08 | 0.02 | 0.02 | 0.03 |
| | $B_2O_3$ | 0.05 | 0.48 | 0.01 | 0.01 | 0.01 | 0.04 | 0.09 | 0.40 |
| | CaO | 0.06 | 0.06 | 0.06 | 0.06 | 0.05 | 0.06 | 0.05 | 0.06 |
| | BaO | 0.42 | 0.56 | 0.53 | 0.53 | 0.52 | 0.02 | 0.45 | 0.52 |
| | $Fe_2O_3 + TiO_2$ | 0.14 | 0.14 | 0.18 | 0.18 | 0.18 | 0.17 | 0.45 | 0.17 |
| | $SnO_2$ | <0.01 | 0.20 | 0.18 | 0.18 | 0.31 | <0.01 | 0.25 | 0.37 |
| | $P_2O_5$ | <0.01 | <0.01 | <0.01 | <0.01 | 0.15 | <0.01 | <0.01 | <0.01 |
| | MgO | <0.01 | <0.01 | <0.01 | <0.01 | <0.01 | <0.01 | <0.01 | <0.01 |
| $Na_2O + K_2O$ | | 0.17 | 0.05 | 0.39 | 0.36 | 0.38 | 0.16 | 0.17 | 0.13 |
| $SnO_2/B_2O_3$ | | 0.00 | 0.42 | 18.00 | 18.00 | 31.00 | 0.00 | 2.78 | 0.93 |
| $C_{SnO2} + C_{B2O3}/2$ | | 0.03 | 0.44 | 0.19 | 0.19 | 0.32 | 0.02 | 0.30 | 0.57 |
| Cracks during production | | Yes | No | Yes | Yes | Yes | Yes | No | No |
| Thermal Cycle 1 Residual volume expansion | | Poor | Poor | Very Good | Very Good | Poor | Poor | Poor | Poor |
| Thermal Cycle 2 Residual volume expansion | | Poor | Poor | Good | Good | Poor | Poor | Poor | Poor |
| Bulk density [g/cm$^3$] | | 5.19 | 5.51 | 5.45 | 5.46 | 5.46 | 5.26 | 5.46 | 5.46 |
| Porosity [%] | | 5.8 | 1.4 | 0.8 | 0.8 | 0.8 | 6.6 | 0.7 | 1.2 |
| Corrosion resistance | | Poor | Very Good | Very Good | Very Good | Very Good | Poor | Very Good | Very Good |

| | | Comparative Examples | | Reference Examples | | | | |
|---|---|---|---|---|---|---|---|---|
| | | 26 | 27 | 1 | 2 | 3 | 4 | 5 |
| Chemical Composition (% by weight) | $ZrO_2 + HfO_2$ | 97.68 | 96.89 | 94.70 | 94.92 | 94.27 | 94.76 | 94.14 |
| | $SiO_2$ | 0.95 | 1.56 | 2.54 | 2.49 | 2.20 | 2.64 | 3.81 |
| | $Al_2O_3$ | 0.25 | 0.38 | 1.89 | 1.03 | 1.62 | 0.95 | 0.93 |
| | $Na_2O$ | 0.20 | 0.16 | 0.16 | 0.12 | 0.11 | 0.40 | 0.25 |
| | $K_2O$ | 0.01 | 0.05 | 0.02 | 0.02 | 0.02 | 0.00 | 0.03 |
| | $B_2O_3$ | 0.05 | 0.14 | 0.05 | 0.05 | 0.50 | 0.01 | 0.05 |
| | CaO | 0.05 | 0.05 | 0.05 | 0.04 | 0.28 | 0.05 | 0.06 |
| | BaO | 0.30 | 0.55 | 0.42 | 1.05 | 0.49 | 0.52 | 0.55 |
| | $Fe_2O_3 + TiO_2$ | 0.17 | 0.17 | 0.17 | 0.18 | 0.17 | 0.19 | 0.18 |
| | $SnO_2$ | 0.34 | 0.05 | <0.01 | 0.10 | 0.34 | 0.17 | <0.01 |
| | $P_2O_5$ | <0.01 | <0.01 | <0.01 | <0.01 | <0.01 | <0.01 | <0.01 |
| | MgO | <0.01 | <0.01 | <0.01 | <0.01 | <0.01 | 0.31 | <0.01 |
| $Na_2O + K_2O$ | | 0.21 | 0.21 | 0.18 | 0.14 | 0.13 | 0.40 | 0.28 |
| $SnO_2/B_2O_3$ | | 6.80 | 0.36 | 0.00 | 2.00 | 0.68 | 17.00 | 0.00 |
| $C_{SnO2} + C_{B2O3}/2$ | | 0.37 | 0.12 | 0.03 | 0.13 | 0.59 | 0.18 | 0.03 |
| Cracks during production | | Yes | Minute | Yes | Yes | No | Yes | Minute |
| Thermal Cycle 1 Residual volume expansion | | Poor | Good | Poor | Good | Poor | Poor | Good |
| Thermal Cycle 2 Residual volume expansion | | Poor | Poor | Poor | Poor | Poor | Poor | Poor |
| Bulk density [g/cm$^3$] | | 5.65 | 5.45 | 5.23 | 5.45 | 5.41 | 5.43 | 5.38 |
| Porosity [%] | | 1.5 | 2.4 | 4.9 | 0.8 | 0.7 | 0.7 | 1.4 |
| Corrosion resistance | | Very Good | Good | Poor | Very Good | Good | Good | Good |

REFERENCE SIGNS LIST

1 Sample for corrosion resistance evaluation

2 Molten glass

3 Crucible of high zirconia electrically-fused cast refractory

4 High zirconia electrically-fused cast refractory comprising 93% by mass of zirconia after the corrosion resistance test

5 Refractory according to Comparative Example 23 after the corrosion resistance test

6 Refractory according to Example 5 after the corrosion resistance test

The invention claimed is:

1. A high zirconia electrically-fused cast refractory, comprising, as a chemical composition, more than 95% by mass and 98% by mass or less of $ZrO_2$, 0.1 to 1.5% by mass of $Al_2O_3$, 1 to 2.5% by mass of $SiO_2$, 0 to 0.1% by mass of $K_2O$, 0.01 to 0.3% by mass of $Na_2O$ and $K_2O$ in total, 0.02 to 0.4% by mass of $B_2O_3$, 0.01 to 0.6% by mass of BaO, 0.01 to 0.4% by mass of $SnO_2$, 0.3% by mass or less of $Fe_2O_3$ and $TiO_2$ in total, and 0.04% by mass or less of $P_2O_5$, wherein the contents of $B_2O_3$ and $SnO_2$ satisfy the following Formulas (1) and (2):

$$0.20 < (SnO_2/B_2O_3) < 6.5 \quad (1)$$

-continued $$0.14\% \text{ by mass} < (C_{SnO2} + C_{B2O3}/2) < 0.55\% \text{ by mass} \quad (2)$$

(in Formula (2), $C_{SnO2}$ represents the content of $SnO_2$, and $C_{B2O3}$ represents the content of $B_2O_3$, expressed in % by mass in the refractory), and wherein the high zirconia electrically-fused cast refractory is characterized in that the bulk density is 5.40 g/cm$^3$ or more.

2. A high zirconia electrically-fused cast refractory, comprising, as a chemical composition, 96 to 98% by mass of $ZrO_2$, 0.4 to 1% by mass of $Al_2O_3$, 1% by mass or more and less than 2.5% by mass of $SiO_2$, 0 to 0.08% by mass of $K_2O$, 0.05 to 0.3% by mass of $Na_2O$ and $K_2O$ in total, 0.05 to 0.35% by mass of $B_2O_3$, 0.1 to 0.5% by mass of BaO, 0.05 to 0.35% by mass of $SnO_2$, 0.3% by mass or less of $Fe_2O_3$ and $TiO_2$ in total, and 0.04% by mass or less of $P_2O_5$, wherein the contents of $B_2O_3$ and $SnO_2$ satisfy the following Formulas (3) and (4):

$$0.40 < (SnO_2/B_2O_3) < 4.5 \quad (3)$$

$$0.16\% \text{ by mass} < (C_{SnO2} + C_{B2O3}) < 0.45\% \text{ by mass} \quad (4)$$

(in Formula (4), $C_{SnO2}$ represents the content of $SnO_2$, and $C_{B2O3}$ represents the content of $B_2O_3$, expressed in % by mass in the refractory), and wherein the high zirconia electrically-fused cast refractory is characterized in that the bulk density is 5.40 g/cm$^3$ or more.

3. A high zirconia electrically-fused cast refractory, comprising, as a chemical composition, 96.5 to 98% by mass of $ZrO_2$, 0.65 to 0.95% by mass of $Al_2O_3$, 1.5% by mass or more and less than 2.5% by mass of $SiO_2$, 0 to 0.05% by mass of $K_2O$, 0.05 to 0.25% by mass of $Na_2O$ and $K_2O$ in total, 0.05 to 0.3% by mass of $B_2O_3$, 0.15 to 0.5% by mass of BaO, 0.1 to 0.35% by mass of $SnO_2$, 0.2% by mass or less of $Fe_2O_3$ and $TiO_2$ in total, and 0.04% by mass or less of $P_2O_5$, wherein the contents of $B_2O_3$ and $SnO_2$ satisfy the following Formulas (5) and (6):

$$0.60 < (SnO_2/B_2O_3) < 4.0 \quad (5)$$

$$0.18\% \text{ by mass} < (C_{SnO2} + C_{B2O3}/2) < 0.40\% \text{ by mass} \quad (6)$$

(in Formula (6), $C_{SnO2}$ represents the content of $SnO_2$, and $C_{B2O3}$ represents the content of $B_2O_3$, expressed in % by mass in the refractory), and wherein the high zirconia electrically-fused cast refractory is characterized in that the bulk density is 5.40 g/cm$^3$ or more.

4. The high zirconia electrically-fused cast refractory according to claim 1, characterized in that the content of CuO is less than 0.01% by mass.

5. The high zirconia electrically-fused cast refractory according to claim 1, characterized in that the content of MgO is 0.05% by mass or less.

6. The high zirconia electrically-fused cast refractory according to claim 1, characterized in that the content of CaO is 0.01 to 0.2% by mass.

7. The high zirconia electrically-fused cast refractory according to claim 1, characterized in that the porosity is 1.5% or less.

8. The high zirconia electrically-fused cast refractory according to claim 1, which is used for a glass melting furnace.

* * * * *